US006939488B2

(12) United States Patent
Blömacher et al.

(10) Patent No.: US 6,939,488 B2
(45) Date of Patent: Sep. 6, 2005

(54) BINDING AGENT FOR INORGANIC MATERIAL POWDERS FOR PRODUCING METALLIC AND CERAMIC MOULDED BODIES

(75) Inventors: Martin Blömacher, Meckenheim (DE); Dieter Weinand, Neustadt (DE); Hans Wohlfromm, Mannheim (DE); Johan Herman Hendrik ter Maat, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/257,873

(22) PCT Filed: Apr. 19, 2001

(86) PCT No.: PCT/EP01/04448

§ 371 (c)(1),
(2), (4) Date: Oct. 17, 2002

(87) PCT Pub. No.: WO01/81467

PCT Pub. Date: Nov. 1, 2001

(65) Prior Publication Data

US 2003/0091456 A1 May 15, 2003

(30) Foreign Application Priority Data

Apr. 19, 2000 (DE) .......................................... 100 19 447

(51) Int. Cl.$^7$ ............................... B29B 9/10; B29B 9/06

(52) U.S. Cl. ............................... 264/5; 264/13; 264/14; 425/183; 425/301

(58) Field of Search ................................ 425/183, 301; 264/5, 13, 14

(56) References Cited

U.S. PATENT DOCUMENTS

| 5,198,489 | A | | 3/1993 | Sterzel et al. ................ 524/439 |
| 5,362,791 | A | * | 11/1994 | Ebenhoech et al. .......... 524/440 |
| 5,695,697 | A | * | 12/1997 | Trubenbach et al. ........ 264/29.1 |
| 5,802,437 | A | | 9/1998 | Wohlfromm et al. .......... 419/37 |

FOREIGN PATENT DOCUMENTS

| DE | 40 00 278 | 2/1991 |
| EP | 0 465 940 | 1/1992 |

* cited by examiner

Primary Examiner—Stephen J. Lechert, Jr.
(74) Attorney, Agent, or Firm—Keil & Weinkauf

(57) ABSTRACT

A binder B for inorganic powders comprises a mixture of
 b1 from 80 to 99.5% by weight of a polyoxymethlene homopolymer or copolymer B1 and
 b2 from 0.5 to 20% by weight of a polymer system B2 which is not miscible with B1 and comprises
 b21 from 5 to 100% by weight of polytetrahydrofuran B21 and
 b22 from 0 to 95% by weight of at least one polymer B22 of $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl (meth)acrylates.

8 Claims, No Drawings

BINDING AGENT FOR INORGANIC MATERIAL POWDERS FOR PRODUCING METALLIC AND CERAMIC MOULDED BODIES

This application is a 371 of PCT/EP01/04448, filed Apr. 19, 2001.

The present invention relates to binders for inorganic powders, thermoplastic compositions comprising these binders for producing shaped inorganic bodies, a process for preparing them, their use and a process for producing shaped bodies therefrom.

Shaped metallic and ceramic bodies can be produced by injection molding of thermoplastic compositions comprising metal powders or metal oxide powders together with an inorganic binder. These are highly filled organic polymer molding compositions. After injection molding, extrusion or pressing of the thermoplastic composition to give a green body, the organic binder is removed and the resulting binder-free green body is sintered.

EP-A-0 465 940 relates to such thermoplastic compositions for producing shaped metallic bodies, which thermoplastic compositions comprise a sinterable pulverulent metal or a pulverulent metal alloy or a mixture thereof and a mixture of polyoxymethylene homopolymers or copolymers and a polymer which is immiscible therewith as binder. Possible additional polymers are polyolefins, in particular polyethylene and polypropylene, and also polymers of methacrylic esters, e.g. PMMA. Binder removal can be carried out by treatment at elevated temperature in a gaseous acid-containing atmosphere.

DE-A-40 00 278 relates to a process for producing a sintered shaped inorganic part. For this purpose, a mixture of a sinterable inorganic powder and polyoxymethylene as binder is shaped to give a green body. The binder is removed by treatment of the green body with a gaseous atmosphere comprising boron trifluoride. The green body which has been treated in this way is subsequently sintered. Examples of sinterable powders are oxidic ceramic powders such as $Al_2O_3$, $ZrO_2$, $Y_2O_3$, and also nonoxidic ceramic powders such as $SiC$, $Si_3N_4$.

However, the binder systems used cannot be removed completely without leaving a residue in all cases.

A further disadvantage of the known binders is their not always satisfactory flow if they are to be processed to form highly filled thermoplastic compositions. Particularly in the case of complex injection-molded parts, this can sometimes result in incomplete filling of the mold.

It is an object of the present invention to provide an improved binder for inorganic powders which avoids the disadvantages of the known binders. In particular, it should be able to be removed during binder removal without leaving a residue, even in cases in which the known binders are unsatisfactory. In addition, it should have good flow.

We have found that this object is achieved by a binder B for inorganic powders, comprising a mixture of b1 from 80 to 99.5% by weight of a polyoxymethylene homopolymer or copolymer B1 and b2 from 0.5 to 20% by weight of a polymer system B2 which is not miscible with B1 and comprises b21 from 5 to 100% by weight of polytetrahydrofuran B21 and b22 from 0 to 95% by weight of at least one polymer B22 of $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl (meth)acrylates.

According to the present invention, it has been found that concomitant use of polytetrahydrofuran in binders comprising polyoxymethylene homopolymers or copolymers results in them having improved flow and them being able to be removed without leaving a residue during binder removal. Thus, in particular, injection-molded bodies having a complex shape can be produced and have the binder removed without problems. The outlay for cleaning the sintering furnaces is dispensed with.

The individual components of the binder B are described in more detail below.

As component B1, use is made of polyoxymethylene homopolymers or copolymers in an amount of from 80 to 99.5% by weight, preferably from 85 to 98% by weight, based on the total amount of the binder B.

The polyoxymethylene homopolymers or copolymers are known per se. The homopolymers are generally prepared by polymerization of formaldehyde or trioxane, preferably in the presence of suitable catalysts.

Polyoxymethylene copolymers which are preferred according to the present invention comprise, in addition to the repeating units —$OCH_2$—, up to 50 mol %, preferably from 0.1 to 20 mol % and in particular from 0.3 to 10 mol %, of repeating units of the formula —O—$CR^1R^2$—$CR^3R^4$—$(R^5-)_n$—, where $R^1$ to $R^4$ are, independently of one another, hydrogen atoms, $C_{1-4}$-alkyl radicals or halogen-substituted $C_{1-4}$-alkyl radicals. $R^5$ is a unit $CH_2$—, $CH_2O$—, a $C_{1-4}$-alkyl- or halogen-substituted $C_{1-4}$-alkyl-substituted methylene group or a corresponding oxymethylene group. n is in the range from 0 to 3. These groups are preferably introduced into the copolymers by ring-opening of cyclic ethers. Preferred cyclic ethers are mentioned in EP-A-0 465 940. Examples are ethylene oxide, 1,2-propylene oxide, 1,2-butylene oxide, 1,3-butylene oxide, 1,3-dioxane, 1,3-dioxolane and dioxepane. In addition, mention may be made of linear oligoformals or polyformals such as polydioxolane or polydioxepane as comonomers. It is also possible to use oxymethylene terpolymers which can be obtained, for example, by reaction of trioxane with one of the above-described cyclic ethers and with a bisglycidyl compound, as described in EP-A-0 465 940. Preferred monomers of this type are ethylene diglycide, diglycidyl ether and diethers of glycidyls and formaldehyde, dioxane or trioxane in a molar ratio of 2:1 and also diethers of 2 mol of glycidyl compound and 1 mol of an aliphatic diol having from 2 to 8 carbon atoms, e.g. diglycidyl ethers of ethylene glycol, 1,4-butanediol, 1,3-butanediol, cyclobutane-1,3-diol, 1,2-propanediol and cyclohexane-1,4-diol.

Methods of preparing the polyoxymethylene homopolymers and copolymers are known to those skilled in the art.

The preferred polyoxymethylene homopolymers or copolymers have melting points of at least 150° C. and molecular weights (weight average) in the range from 5000 to 150 000, preferably from 7000 to 60 000.

As component B2, use is made of polymer systems which are not miscible with the component B1. The component B2 is used in an amount of from 0.5 to 20% by weight, preferably from 2 to 15% by weight, based on the binder B.

The polymer system B2 in turn comprises from 50 to 100% by weight, preferably from 10 to 90% by weight, of polytetrahydrofuran as component B21 and from 0 to 95% by weight, preferably from 10 to 90% by weight, of at least one polymer B22 of $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl (meth)acrylates. The amounts specified are based on the polymer system B2.

The polytetrahydrofuran used as component B21 is known per se and can be obtained by known methods.

The polytetrahydrofuran preferably has a melting point of at least 15° C. and a molecular weight (weight average) in the range from 500 to 2500, preferably from 1000 to 2000.

The component B22 is selected from among polymers of $C_{2-8}$-olefins, preferably $C_{2-4}$-olefins such as ethylene and propylene, vinylaromatic monomers such as styrene and α-methylstyrene, vinyl esters of aliphatic $C_{1-8}$-carboxylic acids e.g. vinyl acetate and vinyl propionate, vinyl $C_{1-8}$-alkyl ethers such as vinyl methyl ether and vinyl ethyl ether, and $C_{1-12}$-alkyl (meth)acrylates such as methyl methacrylate or ethyl methacrylate. The component B22 is preferably at least one polymer of ethylene, propylene or ethyl methacrylate.

The polymers of the component B22 can be prepared by polymerization processes known per se, preferably by free-radical polymerization, for example by emulsion, bead, solution or bulk polymerization. Suitable initiators are, depending on the monomers and the type of polymerization, free-radical initiators such as peroxy compounds and azo compounds, with the amounts of initiator generally being in the range from 0.001 to 0.5% by weight, based on the monomers. Suitable polymerization processes are described in EP-A-0 465 940.

The binders B of the present invention are used in thermoplastic compositions for producing shaped inorganic bodies. These compositions comprise a from 40 to 85% by volume, preferably from 45 to 70% by volume, of at least one sinterable inorganic powder A, b from 15 to 60% by volume, preferably from 29 to 54% by volume, of at least one binder B as described above, c from 0 to 7% by volume, preferably from 1 to 4% by volume, of at least one dispersant C, where the sum of the components A, B and C is 100% by volume.

The sinterable inorganic powder A can be selected from among all known, suitable sinterable inorganic powders. It is advantageously selected from among metal powders, metal alloy powders, metal carbonyl powders, ceramic powders and mixtures thereof.

Examples of metals which may be present in powder form are iron, cobalt, nickel and silicon. Alloys are, for example, light metal alloys based on aluminum and titanium and also alloys of copper or bronze. Hard substances such as tungsten carbide, boron carbide or titanium nitride can also be used in combination with metals such as cobalt and nickel. These can be used, in particular, in the production of cemented cutting tools (known as cermets). Further suitable inorganic powders are oxidic ceramic powders such as $Al_2O_3$, $ZrO_2$, $Y_2O_3$, and also nonoxidic ceramic powders such as SiC, $Si_3N_4$. Suitable powders are described, for example, in EP-A-0 465 940, EP-A-0 710 516, DE-A-39 36 869, DE-A-40 00 278 and EP-A-0 114 746 and also the references cited therein.

The particle sizes of the powders are preferably from 0.1 to 50 μm, particularly preferably from 0.2 to 8 μm. The metal powders, metal alloy powders, metal carbonyl powders and/or ceramic powders can also be used in admixture.

Owing to the good flow of the binder of the present invention, high loading of the binder with the powder A is possible without the flow being adversely affected to an excessive degree.

The dispersant which may be present as component C can be selected from among known dispersants. Examples are oligomeric polyethylene oxide having a mean molecular weight of from 200 to 600, stearic acid, stearamide, hydroxystearic acid, fatty alcohols, fatty alcohol sulfonates and block copolymers of ethylene oxide and propylene oxide, and also, particularly preferably, polyisobutylene. Particular preference is given to using polyisobutylene in an amount of from 1 to 6% by volume, based on the components A, B and C.

In addition, the thermoplastic compositions can further comprise customary additives and processing aids which favorably influence the rheological properties of the mixtures during shaping.

The preparation of the thermoplastic compositions of the present invention is carried out, according to the present invention, by melting the component B and mixing-in the components A and, if used, C. For example, the component B can be melted in a twin-screw extruder at preferably from 150 to 220° C., in particular from 170 to 200° C. The required amount of the component A is subsequently metered into the melt stream of the component B at temperatures in the same range. The dispersant or dispersants C is/are advantageously present on the surface of the component A.

A particularly preferred apparatus for metered addition of the component A comprises as essential element a transport screw which is located in a heatable metal cylinder and feeds the component A into the melt of the component B.

Compared to mixing the components at room temperature and subsequent extrusion with an increase in temperature, the above-described process has the advantage that decomposition of the polyoxymethylene used as binder is largely avoided due to the high shear forces occurring in this variant.

The thermoplastic compositions of the present invention can be used for producing shaped bodies from the powder A. These are, in particular, shaped metallic or ceramic bodies, where the shaped metallic bodies can also include shaped bodies made of metal alloys.

The present invention also provides a process for producing shaped bodies from the powders A described by 1) shaping a thermoplastic composition as described above by injection molding, extrusion or pressing to form a green body, 2) removing the binder by treating the green body at from 20 to 180° C. with a gaseous acid-containing atmosphere for from 0.1 to 24 hours, 3) subsequently heating at from 250 to 500° C. for from 0.1 to 12 hours and 4) subsequently sintering the binder-free green body obtained in this way.

Shaping by injection molding can be carried out using the customary screw and plunger injection molding machines. Shaping is generally carried out at from 175 to 200° C. and pressures of from 3000 to 20 000 kPa in molds which are at from 60 to 120° C.

Extrusion to produce pipes, rods and profiles is preferably carried out at from 170 to 200° C.

To remove the binder, the green bodies obtained after shaping are treated with a gaseous, acid-containing atmosphere. Appropriate methods are described, for example, in DE-A-39 29 869 and DE-A-40 00 278. According to the present invention, this treatment is preferably carried out at from 20 to 180° C. for a period of preferably from 0.1 to 24 hours, more preferably from 0.5 to 12 hours.

Suitable acids for the treatment in this first stage of the process of the present invention are, for example, inorganic acids which are gaseous at room temperature or are at least vaporizable at the treatment temperature. Examples are hydrohalic acids and nitric acid.

Suitable organic acids are ones which have a boiling point of less than 130° C. at atmospheric pressure, for example formic acid, acetic acid or trifluoroacetic acid or mixtures thereof.

It is also possible to use $BF_3$ and its adducts with inorganic ethers as acid. The required treatment time depends on the treatment temperature and the concentration of the acid in the treatment atmosphere as well as on the size of the shaped body.

If a carrier gas is used, it is generally passed through the acid and loaded with this before the treatment. The laden carrier gas is then brought to the treatment temperature which is advantageously higher than the loading temperature so as to avoid condensation of the acid. Preferably, the acid is mixed into the carrier gas via a metering device and the mixture is heated to a temperature at which the acid can no longer condense.

The acid treatment is preferably carried out until at least 80% by weight, preferably at least 90% by weight, of the polyoxymethylene component of the binder has been removed. This can be checked, for example, by means of the weight loss. The product obtained in this way is subsequently heated to preferably from 250 to 700° C., particularly preferably from 250 to 600° C., for preferably from 0.1 to 12 hours, particularly preferably from 0.3 to 6 hours, so as to remove the remainder of the binder completely.

The product which has been freed of the binder in this way can be converted in a customary manner by sintering into the desired shaped body, in particular the shaped metallic or ceramic body.

The thermoplastic compositions of the present invention have, apart from residue-free binder removal, good flow and high loadability with the powders A, the additional advantage that the green bodies or shaped metallic or ceramic bodies produced therefrom are free of cracks and pores even at high thicknesses. A further advantage is that removal of the binder can be carried out in two stages. Firstly, the polyoxymethylene is removed by hydrolytic degradation at relatively low temperatures, leaving the major part of the polymer system B2. The resulting products (white bodies) are relatively strong and can be handled or transported without problems. The removal of the remainder of the polymer system B2 can then be carried out at elevated temperatures.

The invention is illustrated by the examples below.

EXAMPLE

In the following examples, different polyoxymethylene-containing binders were used. The composition 1B consisted of the following components:

56.5% by volume of a mixture of 92% by weight of carbonyl iron and 8% by weight of carbonyl nickel 37.3% by volume of polyoxymethylene 6.2% by volume of polyolefin The second composition 2B consisted of the following components:

64.8% by volume of a prealloyed powder of the alloy 316L 32.5% by volume of polyoxymethylene 2.7% by volume of polyolefin In addition, the following composition 3B, which serves for the production of ceramics, was examined:

81.6% by weight of zirconium oxide 14.2% by weight of polyoxymethylene 1.7% by weight of dispersant 2.5% by weight of polybutanediol formal In these base materials of the prior art, different amounts of the polymer systems present in addition to polyoxymethylene were replaced by polytetrahydrofuran in the following experiments. The tables below indicate the proportion by weight (in % by weight) of the polymer system present in addition to polyoxymethylene which was replaced by polytetrahydrofuran (PTHF). The flow was then determined, using the melt flow index (MFI) as a measure of flow. The melt flow index was determined at 190° C. under a load of 21.9 kg or 10 kg in Nos. C9 and 10.

The various compositions are shown in the following table.

TABLE 1

| No. | Composition | Comment | MFI [g/10 min] |
|---|---|---|---|
| C1 | 1B | POM + further polymers (P) | 200–400 (typical) |
| 2 | 1B + PTHF | total amount of (P) replaced by PTHF | 2139 |
| 3 | 1B + 0.3 PTHF | about 30% of the amount of (P) replaced by PTHF, remainder POM | 540 |
| 4 | 1B + 0.17 PTHF | about 17% of the amount of (P) replaced by PTHF, remainder POM | 297 |
| C5 | 2B | POM + further polymers (P) | 400–600 (typical) |
| 6 | 2B + 0.75 PTHF | about 75% of the amount of (P) replaced by PTHF, remainder POM | 1614 |
| 7 | 2B + 0.5 PTHF | about 50% of the amount of (P) replaced by PTHF, remainder POM | 917 |
| 8 | 2B + 0.4 PTHF | about 40% of the amount of (P) replaced by PTHF, remainder POM | 518 |
| C9 | 3B | POM + further polymers (P) | 43 |
| C10 | 3B | total amount of (P) replaced by PTHF | 66 |

The results in Table 1 show that the flow is increased by a multiple when the same amount or a similar amount of the polymer system present in addition to polyoxymethylene is replaced by PTHF.

Examination of the Flow

To enable the flow and thus the processibility of the thermoplastic compositions of the present invention to be compared in a manner which is very close to practice, part of the above compositions was tested using a flow spiral. This is a tool having a spiral flow path. The thermoplastic compositions were injected into this molding tool on a commercial injection molding machine (Engel cc 90) under standard conditions. The injection conditions such as barrel temperature and nozzle temperature, plasticizing time, injection speed and tool temperature were kept unchanged in order to be able to determine the distance for which the material flowed under identical conditions. This flow distance (in cm) is thus a close-to-practice test for the flow of the material under production conditions. The results are summarized in Table 2 below.

TABLE 2

| No. | Composition | Flow distance [cm] | Comment |
|---|---|---|---|
| C1 | 1B | 10–13 | last 2–3 cm not completely filled |
| 3 | 1B + 0.3 PTHF | 20–21 | completely filled |
| 4 | 1B + 0.17 PTHF | 16–17 | completely filled |
| C5 | 2B | 16–17 | last 2–3 cm not completely filled |
| 6 | 2B + 0.75 PTHF | 19–20 | completely filled |
| 8 | 2B + 0.4 PTHF | 21–22 | completely filled |

The thermoplastic compositions of the present invention also enabled a significant improvement in the flow to be achieved under conditions similar to production. In addition, better demolding of the flow spirals was observed in the case of the thermoplastic compositions comprising PTHF.

Examination of Deposits in the Sintering Furnace

When the injection-molded parts from which the binder has been removed are heated in the sintering furnace, considerable contamination (deposits) can occasionally occur in the sintering furnace, probably due to the polymeric constituents of the compositions 1B and 2B which are not attacked during catalytic binder removal. Such contamination occasionally occurred, for example, in the waste gas valves of the furnace.

Such contamination could be very largely avoided by the use of PTHF as polymer in addition to POM.

We claim:

1. A binder B for inorganic powders, comprising a mixture of
   b1 from 80 to 99.5% by weight of a polyoxymethylene homopolymer or copolymer B1 and
   b2 from 0.5 to 20% by weight of a polymer system B2 which is not miscible with B1 and comprises
   b21 from 5 to 100% by weight of polytetrahydrofuran B21 and
   b22 from 0 to 95% by weight of at least one polymer B22 of $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl (meth)acrylates.

2. A binder as claimed in claim 1, wherein the mixture comprises from 85 to 98% by weight of component B1 and from 2 to 15% by weight of component B2.

3. A binder as claimed in claim 1, wherein the component B2 is made up of from 10 to 90% by weight of component B21 and from 10 to 90% by weight of component B22.

4. A binder as claimed in claim 1, wherein the component B22 is at least one polymer of ethylene, propylene or methyl (meth)acrylate.

5. A thermoplastic composition for producing shaped inorganic bodies, comprising
   a from 40 to 85% by volume of at least one sinterable inorganic powder
   b from 15 to 60% by volume of at least one binder B as claimed in claim 1,
   c from 0 to 5% by volume of at least one dispersant C, where the sum of the components A, B and C is 100% by volume.

6. A thermoplastic composition as claimed in claim 5, wherein the powder A is selected from the group consisting of metal powders, metal alloy powders, metal carbonyl powders, ceramic powders and mixtures thereof.

7. A process for preparing thermoplastic compositions as claimed in claim 5 by melting the component B and mixing-in the components A and, if desired, C.

8. A process for producing shaped bodies from powders A by
   (1) shaping a thermoplastic composition as claimed in claim 5 by injection molding, extrusion or pressing to form a green body,
   (2) removing the binder by treating the green body at from 20 to 180° C. with a gaseous acid-containing atmosphere for from 0.1 to 24 hours,
   (3) subsequently heating at from 250 to 500° C. for from 0.1 to 12 hours and
   (4) subsequently sintering the binder-free green body obtained in this way.

* * * * *